March 29, 1938.  O. U. ZERK  2,112,615

VEHICLE WHEEL

Original Filed Sept. 11, 1931  4 Sheets-Sheet 1

INVENTOR.
BY Oscar U. Jerk
Rivis Hudson & Kent
ATTORNEYS.

March 29, 1938.  O. U. ZERK  2,112,615
VEHICLE-WHEEL
Original Filed Sept. 11, 1931  4 Sheets-Sheet 3

INVENTOR.
BY Oscar U. Zerk.
Rivas Hudson Kent
ATTORNEYS.

March 29, 1938.  O. U. ZERK  2,112,615

VEHICLE WHEEL

Original Filed Sept. 11, 1931   4 Sheets-Sheet 4

INVENTOR.
Oscar U. Zerk.
BY Knox Hudson & Kent
ATTORNEYS.

Patented Mar. 29, 1938

2,112,615

UNITED STATES PATENT OFFICE 2,112,615

VEHICLE WHEEL

Oscar U. Zerk, Chicago, Ill., assignor, by mesne assignments, to Budd Wheel Company, Philadelphia, Pa., a corporation of Pennsylvania Application September 11, 1931, Serial No. 562,315
Renewed November 27, 1936

18 Claims.  (Cl. 301—9)

This invention relates to an improved hub demountable sheet metal wheel adapted for automobile or vehicle use, and is an improvement on and is designed to replace wheels of various types which are being used at the present time, among which are disk wheels, wire wheels, wooden wheels, cast wheels, and certain forms of stamped sheet metal wheels.

In my copending application Serial No. 554,482, filed August 1, 1931, I have described a sheet metal wheel which is adapted to be demountably attached to the flange of a spindle bearing or inner hub and composed of a rim and a sheet metal stamping composed of integrally formed spokes and an outer hub, the spokes being secured at their outer ends to the rim and at their inner ends merging into and forming the outer hub. The spokes are substantially U-shaped, the open side of the U being toward the rear of the wheel. The sides are flared laterally on a taper with respect to each other, and each spoke, when viewed from the front or rear, is flared laterally from a point intermediate its inner or outer ends. Additionally, the outer closed side of the spoke is flared downwardly and outwardly so as to form at the outer side of the wheel an outstanding outer hub.

In my second copending application, Serial No. 560,162 filed August 29, 1931, I have shown, described and claimed several different ways in which the improved wheel having the design and construction above described may be effectively secured to the flange of the inner hub.

In both the prior applications above referred to, the wheel is attached to the hub through the medium of an attaching member preferably in the form of a stamping which is welded to the outer hub of the spoke stamping and has the equivalent of an inwardly extending flange designed to be interlocked with and bolted to a flange of the inner hub.

In a third copending application Serial No. 561,541 filed September 8, 1931, I disclose a wheel which employs or embodies the main novel features of my first application above referred to in the respect that there is used a spoke stamping composed of integrally formed spokes and an outer hub quite similar to that disclosed in my first application above referred to but modified to adapt it for a wheel of the type wherein the wheel is supported on two flanges or portions of the inner hub and detachably connected to one of them.

In the disclosures of all three of the above mentioned applications, the attaching devices in the form of screws or bolts are arranged within the outer hub and are therefore concealed by the hub cap which is fitted onto the outer end of the outer hub.

My present invention utilizes a spoke stamping having integrally formed spokes and an outer hub much as in my prior applications above referred to, but the present wheel differs from those disclosed in the prior applications in the respect that the fastening bolts are situated outside the outer hub and of course outside the outer hub cap.

The principal object, therefore of the present invention is to provide a hub demountable wheel having a spoke stamping of the general type disclosed in my prior applications but modified to permit the use of attaching bolts which are situated outside of the outer hub forming a part of the spoke stamping.

A further object is to accomplish the main object stated above with an outer hub which has ample strength to transmit the load and driving stresses to the inner hub, and in order that this may be done without requiring a spoke stamping of unnecessary thickness, the outer hub of the spoke stamping is preferably strengthened in a novel manner, preferably through the medium of a drawn or stamped member which is placed inside the outer hub and is rigidly connected to the same, as by welding.

A still further object is to utilize the attaching bolts which are arranged on the outer side of the outer hub, as stated above, to also attach a brake drum to the inner hub.

In accordance with the present invention, the inner part of the outer hub is bolted between the sheet metal spokes to a flange arranged at the inner end of the inner hub. Portions of the hub stamping between the spokes may be offset outwardly at the inner end of the hub and the fastening bolts may be extended through these offset portions and the flange of the inner hub. In the event that the outer hub is reenforced by a stamped or drawn cup or barrel, the latter may extend substantially the full length of the outer hub of the spoke stamping and at its inner end may be flanged outwardly and engage the offset portions of the outer hub of the spoke stamping between the spokes. In the event the hub is thus strengthened, the securing bolts pass through the outwardly flanged part of the strengthening member or through both the latter and the outer hub proper which is integral with the spokes.

The invention may be further briefly summarized as consisting in certain novel combinations and arrangements of parts which will be described in the specification and set forth in the appended claims.

In the accompanying sheets of drawings.

Figure 2:
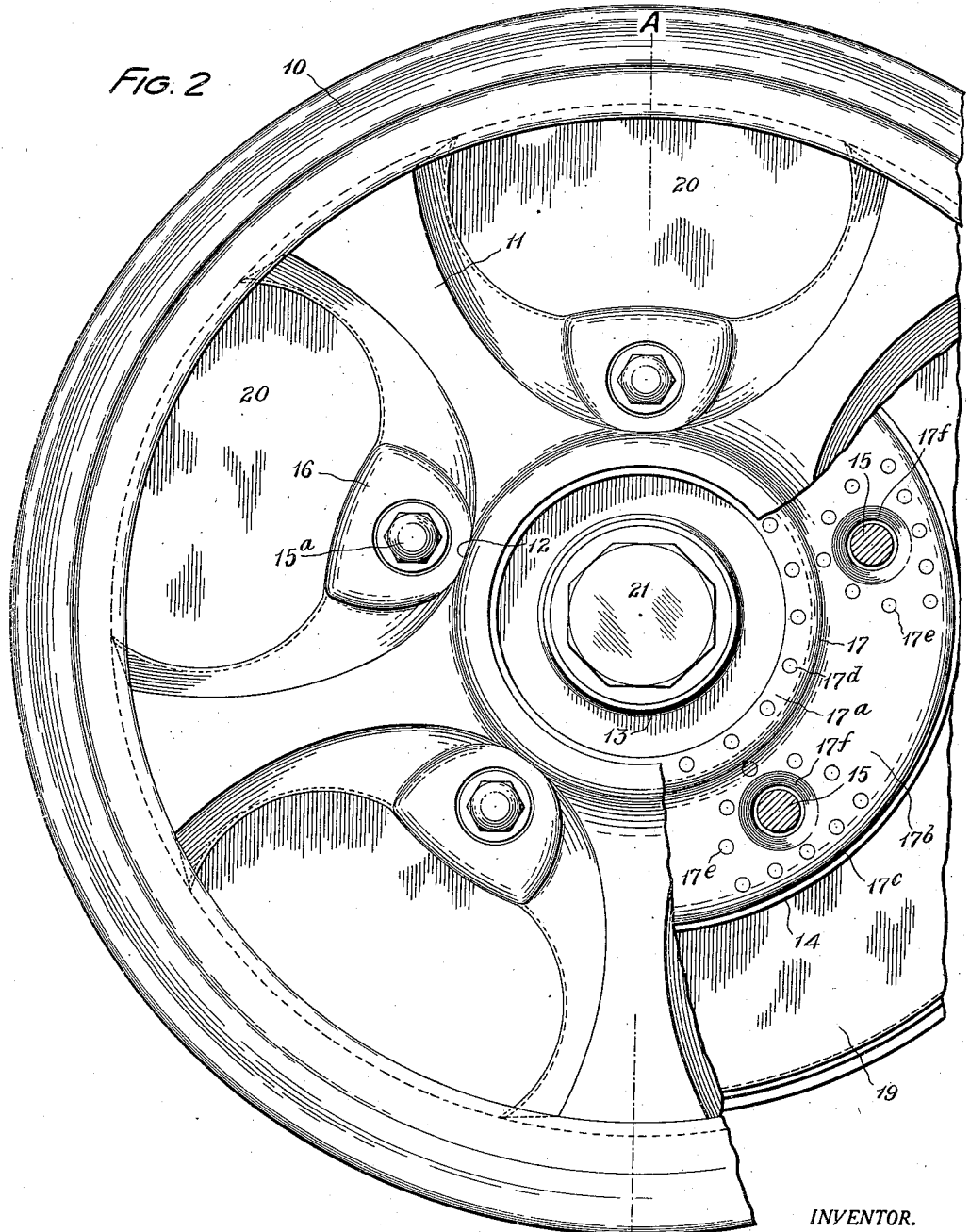
Fig. 2 is a front view of the wheel with the outer hub cap removed and with a portion of the sheet metal unit broken away to show the reenforcing member and the places or regions where the latter is welded to the outer hub of the sheet metal unit.

Referring now to the drawings, 10 represents the rim which receives the tire, the rim having at the center, for strengthening purposes, a drop section, the inner wall 10a of which is tapered to facilitate the welding of the outer spokes of the spoke stamping, as explained in my prior applications. The second part of the wheel is composed of a spoke stamping having a suitable number of spokes 11, here shown as five in number, although the number of spokes may be varied, the spokes being formed integrally with an outer hub 12. The spokes are hollow and substantially U-shaped in cross-section, with the open sides of the U on the inner side of the wheel. From a point intermediate their ends to both their outer and inner ends they flare laterally, as indicated in Fig. 2. In addition, the sides of the spokes viewed in cross section are preferably on a taper, and when the spokes are viewed from the side, they flare from their outer ends downwardly and outwardly to their inner ends where they merge into and form the outer hub 12. With this construction the outer end only of the outer hub portion 12 of the spoke stamping is continuous, and elsewhere is non-continuous since it is formed by the concavo-convex portions of the stamping between the spokes, these portions being alternated with the open spaces or spoke openings extending lengthwise of the spokes. In this instance, the outer hub has a generally cylindrical contour, whereas in the prior application above referred to it has a generally conical contour.

The inner hub to which the wheel is demountably attached is shown at 13, this hub having near its inner end an outstanding substantially radial flange 14 to which the inner part of the outer hub is secured by bolts 15 which are in this instance arranged outside of the outer hub, as stated above. Naturally, the bolts 15 occur between the spokes 11, and to accommodate the bolts 15, the outer hub of the spoke stamping, when formed, must be provided between the spokes with outwardly offset portions 16 through which the outer ends of the bolts are adapted to extend.

I prefer to strengthen the outer hub portion 12 of the spoke stamping so that it has the requisite strength to support the outer part of the wheel under load and to transmit to the inner hub all stresses to which the wheel may be subjected, including the vertical load stresses, the driving stresses, the lateral stresses, and combinations of these which occur in the actual use of the wheel. By thus strengthening the hub, I can employ relatively thin sheet metal in forming the spoke and outer hub stamping, there being preferably employed for this purpose a stamping of about one-sixteenth inch thickness, though the thickness may be varied for different sizes of wheels and for different sizes of vehicles. I prefer to use for this purpose a steel which does not readily crystallize, that is, a steel of high fatigue value and high endurance limit, such as chrome nickel steel, having a tensile strength of 140,000 pounds per square inch. Thus a comparatively thin stamping is used, and though the hub is preferably reenforced as stated, the spokes do not require reenforcement to the same degree as the outer hub in view of the fact that they have a great deal of inherent strength, especially in view of the flaring design, the spokes being flared whether viewed in cross section or viewed from the side or from the front as explained above. However with one form of my invention, the inner portion of the reenforcing member is provided with outwardly extending arms which close the inner open sides of the U-shaped spokes and are welded to the latter and to the rim and here a spoke reenforcement is obtained. However I do not regard a reenforcement either of the outer hub or of the spokes as essential to my invention.

For reenforcing the outer hub portion 12 of the spoke stamping, I prefer to employ a cup or barrel-shaped stamping or drawn reenforcing member 17 which in this instance is of generally cylindrical shape. This reenforcing member, at its outer end, is flanged inwardly as shown at 17a to conform to the inturned flange at the outer end of the outer hub 12 of the spoke stamping.

Figure 5:
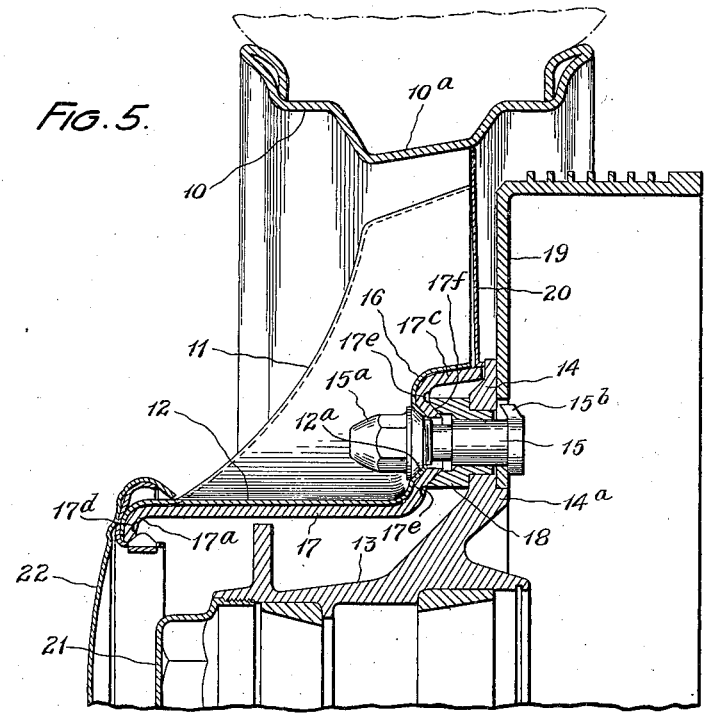
Fig. 5 is a view similar to the upper half of Fig. 1 but showing a slight modification in the form of the conical seats for the nuts which are screwed onto the attaching bolts.

Near its inner end, it is flanged outwardly as shown at 17b to form a wall more or less parallel to and overlapping the substantially radial flange 14 of the inner hub and at its inner end is flanged laterally inward so as to extend toward the flange 14 of the inner hub, as shown at 17c. This barrel, which is welded to the outer hub portion 12 of the stamping, as will be explained, engages the same at its continuous outer end and at the offset portion 16, these portions being offset so as to conform substantially wherever they occur between the spokes to the laterally and inwardly offset portions 17b and 17c of the reenforcing member. The reenforcing member may engage the center lines of the concavo-convex portions of the spoke stamping midway between the spokes, as indicated in some of the figures of the drawings, in which event it will engage the same with a friction fit. However, it is desired that the reenforcement move freely into the hub portion of the spoke stamping during the welding operation, and to bring this about there may be a slight clearance, such as indicated in Fig. 5 hereof, between the reenforcement and the center lines of the concavo-convex portions between the spokes. However, whether the parts engage along the lines stated with a friction fit or are slightly separated is not material to the present invention so long as free relative movement may occur during the welding operation.

The spoke stamping is preferably secured to the rim 10 and to the reenforcing member 17 by welding in both instances. As explained in my prior applications, the outer ends of the spokes are simultaneously and uniformly secured to the inclined wall 10a of the rim and this is accomplished during the welding operation by causing the spoke stamping and rim to be moved relatively so that the outer ends of the spokes and the said inclined wall of the rim will slidingly engage each other. For this purpose, the outer ends of the spokes are inclined and are preferably provided with protuberances where they contact with the rim, these protuberances being melted away during the welding operation. Likewise, the reenforcing member 17 is welded to the outer hub 12 of the spoke stamping at its outer end and between all the spokes simultaneously, the welding occurring at a plurality of points or spots at the outer end and at a plurality of points or spots between each pair of spokes, the places or regions of welding between the spokes surrounding the attaching bolts 15 which lie between the spokes, as pointed out above. To accomplish this, either the outer hub 12 of the spoke stamping or the reenforcing member is provided with protuberances where the welding of the two members together occurs. In this instance, the protuberances are formed on the reenforcing member 17, those at the outer inturned end being indicated at 17d in Fig. 2, and those arranged between the spokes around the openings for the attaching bolts 15 being indicated at 17e in the same figure. During the welding operation the hub of the spoke stamping and the reenforcing member 17 are telescopically slid together and when the protuberances on the one part engage the other part, the welding operation actually begins and at the close of the welding operation the protuberances are melted away and the two parts are effectively welded together at the places or regions stated.

Hereinafter and in the claims, the term "outer hub", when used, will, unless otherwise stated, include the outer hub 12 of the spoke stamping and the reenforcement for the outer hub. That is to say, unless otherwise pointed out, these two parts will be regarded as unitary and as composing the outer hub.

It is desirable in forming the driving and securing connection between the demountable wheel and the flange 14 of the inner hub, that these parts be connected together not only by the securing bolts 15 but by engaging tapered portions provided on the attaching portion of the wheel and hub for the purpose of transmitting the driving stresses. The driving connections may be established in any of the several ways shown and described in my second application above referred to, Serial No. 560,162, filed August 29, 1931, but in this instance I have shown still another way in which this may be accomplished. In this case, bushings 18 are utilized, these bushings surrounding the bolts 15 and having reduced inner ends which are fitted into openings formed in the flange 14 of the inner hub, the enlarged outer ends of the bushings being each formed with a tapered socket concentric with respect to the axis of the bushing. The bolts 15 extend through these bushings and through openings formed in the outstanding or radial flange 17b of the reenforcing member just inside of the laterally extending flange 17c, and also through openings formed in the offset portions 16 of the outer hub of the spoke stamping, the openings in the parts 12 and 17 being, of course, concentric. Additionally, metal surrounding the openings formed in the flange 17b of the reenforcement 17 is formed with inwardly projecting conical protuberances 17b forming on the outer face of the flange 17b conical depressions. The conical protuberances fit into the conical depressions at the outer ends of the bushings 18 so that, in this manner, the major part of the driving stresses are transmitted to the inner hub and the inner ends of the nuts 15a are conically formed, and when the nuts are tightened, the conical ends fit closely in the conical depressions formed on the outer face of the flange 17b, thus tightly drawing the parts together.

Figure 1:
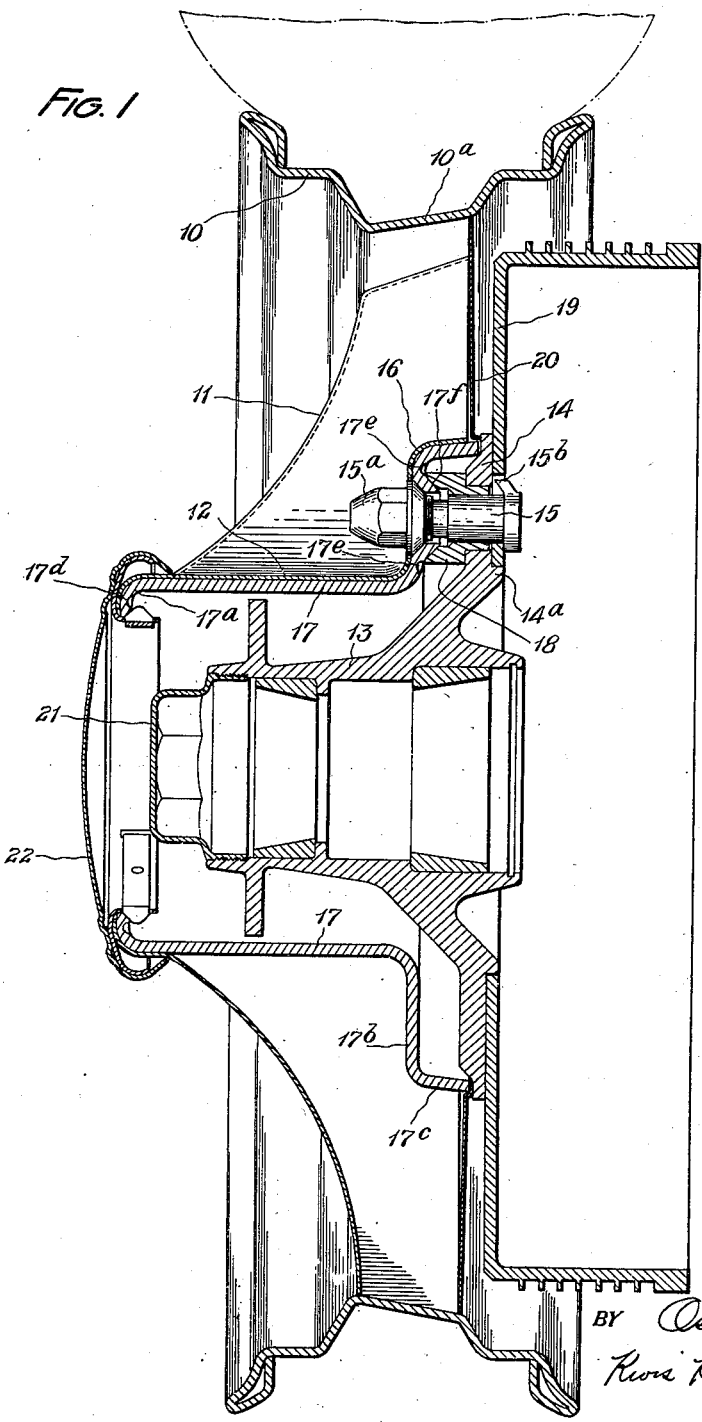
Figure 1 is a cross-section through a five-spoke wheel substantially along the line A—A of Fig. 2.

In Fig. 1 and also in Fig. 3 which will be described below, the inner ends of the nuts bear directly against the metal forming the conical depressions in the outer face of the flange 17b and do not directly engage the metal of the offset portions 16 of the outer hub 12 of the spoke stampings. That is to say, in this instance the bolt openings formed in the offset portions 16 are somewhat larger than the nuts and the metal surrounding the bolt openings in the offset portion 16 does not extend inwardly so as to overlie the metal formed in the conical depressions in the flange 17b of the reenforcement. It will be understood, however, that, if desired, the metal of both the overlying parts, i. e., the offset portions 16 of the outer hub 12 and the flange 17b of the reenforcing member, may have the conical depressions formed therein, in which case the inner conical ends of the nuts 15a will bear against the metal of the offset portions 16 of the outer hub 12, as sown in Fig. 5 at 12a. In either event, the results are the same and this detail is immaterial to my invention. The construction shown in Fig. 5 is otherwise the same as Fig. 1.

I prefer to use the same bolts 15 which secure the wheel to the flange 14 to also hold in place against the inner side of the flange 14 a brake drum 19, as illustrated in Fig. 1. The brake drum bears flat against the inner side of the flange 14, the latter having an annular shoulder 14a which engages the inner edge of a fairly large circular opening formed in the vertical wall of the drum 19. The heads of the bolts fit against the inner side of the brake drum, and to prevent the bolts 15 turning when the nuts 15a are tightened or loosened, the bolt openings in the drum 19 are each formed with a lateral extension, and a portion of the head of the bolt is driven into this opening so as to serve as the equivalent of a key 15b on the head of the bolt.

It may be desirable to close the inner side of the wheel so that the brake drum is not visible from the outer side, and for that purpose I show in Fig. 1 a closure plate or disk 20 which is pressed and held against the inner side of the wheel (so as to close the open sides of the spokes and to close the openings between the spokes) and with its periphery engaging the rim 10. In this instance, the closure plate or disk 20 is fitted onto the extreme inner end of the flange 17c of the reenforcement and is pressed up against the inner side of the wheel by the flange 14 of the inner hub, but, of course, if desired it may be held in place by the brake drum 19.

The inner hub 13 is closed by an inner hub cap 21 and the outer hub, composed of the parts 12 and 17, is closed by an outer hub cap 22 which, in this instance, extends over the continuous outer end of the outer hub 12 of the spoke stamping and may be held in place by a conventional form of snap fastening. The bolts 15 and the nuts 15a are in an annular or circular line slightly radially outward from the periphery of the outer hub and of the outer hub cap 22.

Figure 3:
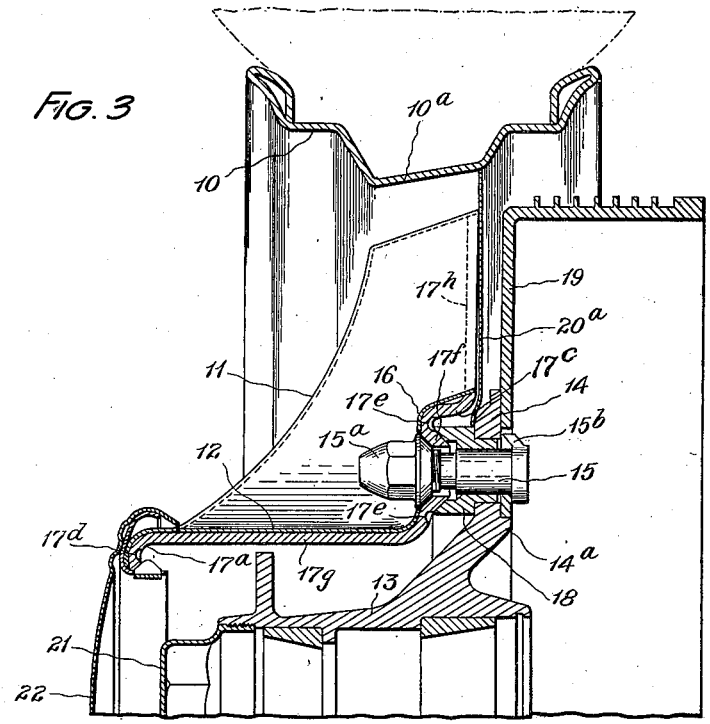
Fig. 3 is a cross-section through one-half of a wheel constructed as shown in Fig. 1 but modified to the extent that the reenforcing member has radial extensions which close the inner normally open sides of the sheet metal spokes.
Figure 4:
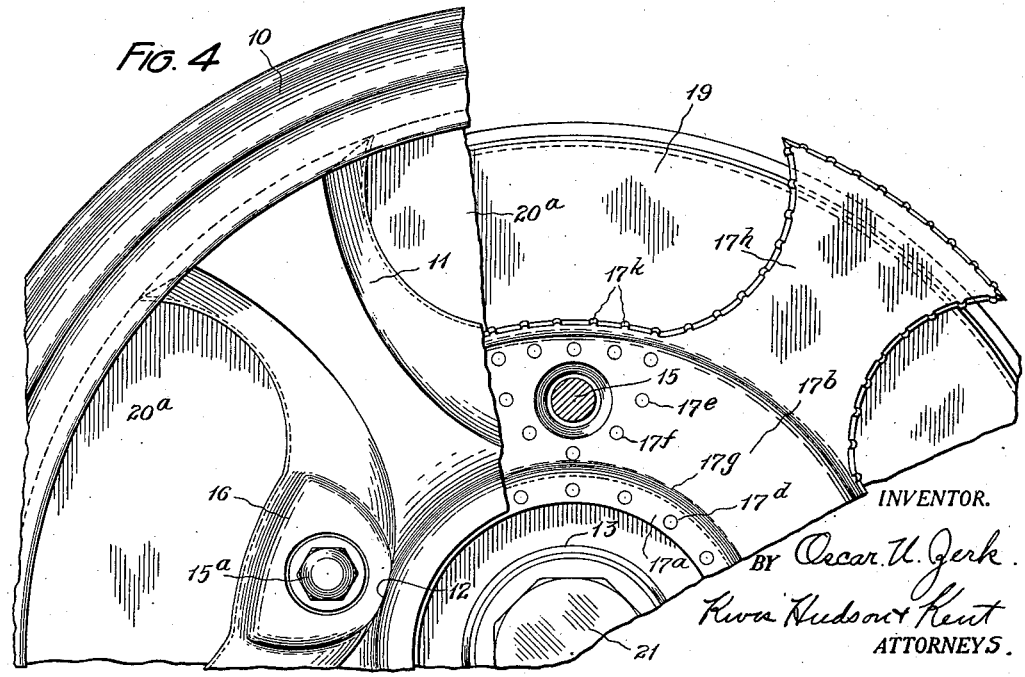
Fig. 4 is a view showing substantially one-half the wheel of Fig. 3 viewed from the outer side with a part of the sheet metal unit broken away to show the reenforcing member with its radial extensions and indicating where the body of the member and the extensions thereof are designed to be welded to the outer hub and spokes of the sheet metal unit and also to the rim.

In Figs. 3 and 4, I have shown a construction which in all respects is similar to that of Figs. 1 and 2, except for a modification in the shape or form of the reenforcement 17 of Figs. 1 and 2. In this instance (Figs. 3 and 4) the reenforcement is designated 17g and differs from the reenforcement 17 in the respect that its inner portion is star-shaped or is provided at its inner side with radial arms 17h which close the open inner sides of the U-shaped spokes 11. The reenforcement 17g is provided with the flanges 17b and 17c of Fig. 1, and the arms 17h are continuations or extensions of the flange 17c. This reenforcing member 17g is welded to the outer end and to the offset portions 16 of the outer hub 12 precisely as before by protuberances 17d and 17e (shown in Fig. 4 as in Fig. 2) and, additionally, simultaneously with the welding of the parts 12 and 17g together at the places mentioned, the perimeter of the star-shaped inner end of the reenforcement 17g is welded to the spoke stamping between the spokes and to the inner sides of the spokes and also to the rim. For this purpose, the reenforcing member 17g is provided on the perimeter just described with protuberances 17k (Fig. 4) to enable its perimeter to be thus welded to the stated portions of the spoke stamping as well as the outer ends of the arms 17h to be welded to the rim. It is understood that this welding operation takes place concurrently with the welding together of the two parts at their outer ends and around the bolt holes (where the protuberances 17d and 17e occur). When the welding operation is completed, the protuberances 17k are melted away and the portions of the perimeter of the star-shaped inner part of the reenforcement lying between the arms 17h closely engage and are secured to portions of the spoke stamping between the spokes at the inner side thereof and the sides of the arms 17h closely engage and lie between and are secured to the inner side portions of the spokes and the extreme outer ends of the arms 17h of the reenforcement fit tightly against and are secured to the rim. Thus the reenforcement closes and strengthens the spokes as well as reenforces the outer hub. The inner side of the wheel may be closed as before by a closure plate 20a substantially as shown in Fig. 1, but which in this instance is fitted onto the bushings 18 since it cannot be fitted on the flange 17c as in Fig. 1.

The other parts not specifically referred to in the description of Figs. 3 and 4 are in all material respects like the corresponding parts of Figs. 1 and 2 and therefore further description is unnecessary and the same reference characters applied to Figs. 1 and 2 are applied to the corresponding parts of Figs. 3 and 4.

The slight modification of Fig. 5 has been described above and therefore this figure requires no further detailed description.

Figure 6:
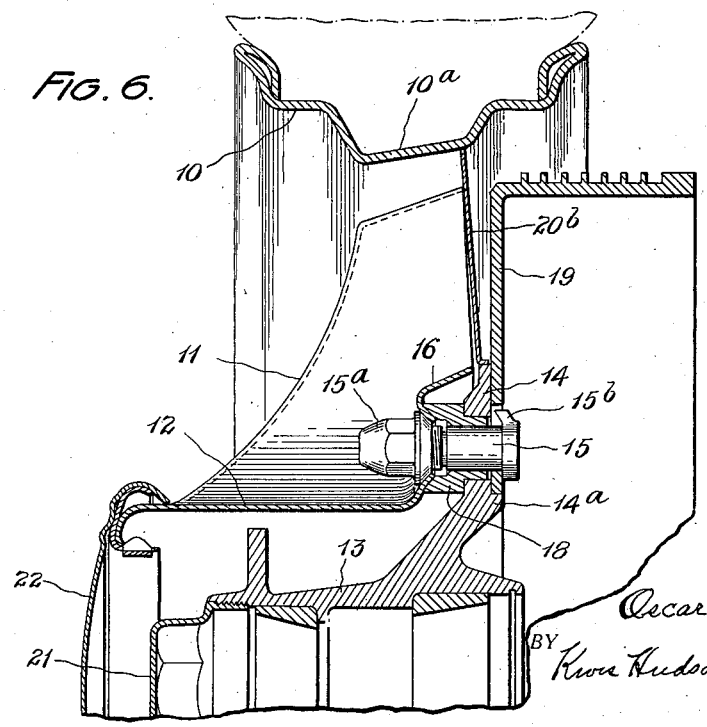
Fig. 6 is a view similar to the upper half of Fig. 1, and therefore similar to Figs. 3 and 5, but showing the outer hub without any reenforcement and formed only by the hub portion 12 of the spoke stamping.

It was previously stated that I do not regard it essential to my invention that the outer hub portion of the spoke stamping be reenforced. Particularly is this true for wheels for light vehicles, that is to say, in wheels designed for light vehicles the outer hub reenforcement or the outer hub and spoke reenforcement may be omitted without the sheet metal used in forming the spoke stamping being of much if any heavier gauge than where a reenforcement is employed for heavier duty wheels. This is illustrated in Fig. 6, which shows a spoke stamping including the outer hub portion 12 similar to that before illustrated. In this instance, the outer hub cap 22 is fitted on the outer continuous end of the spoke stamping only and the connection to the flange 14 of the inner hub by means of the attaching bolts 15 is with the offset portions 16 only of the spoke stamping, the inner conical ends of the nuts 15a being seated in conical depressions in the offset portions 16 and the conical protuberances on the inner sides of the offset portions being held by the conical portions of the nuts in the conical depressions at the outer ends of the bushings 18. In this figure, the wheel is provided with an inner closure plate, here designated 20b, which in this instance is fitted onto the periphery of the flange 14 and is held in place by the brake drum 19. The construction is otherwise unchanged and a further detailed description is unnecessary, the parts similar and corresponding to those of the other views having applied thereto reference characters similar to those already referred to in the descriptions of the preceding figures.

Thus it will be seen that the main objects set forth in the beginning of this specification are accomplished very effectively by my improved wheel herein disclosed. Likewise it will be apparent that while I have shown several slightly different forms of my invention, other changes may be made, and I therefore aim in my claims to cover all modifications which do not involve a departure from the spirit and scope of the invention in its broadest aspects.

Having thus described my invention, I claim:

1. As an article of manufacture, a sheet metal wheel body composed of integrally formed spokes and an outer hub which is adapted to be secured to an inner hub, a reenforcing member positioned within the outer hub and engaging said outer hub between the spokes, said article having provision outside the outer hub and between the spokes for attachment to an inner hub.

2. As an article of manufacture, a sheet metal wheel body composed of integrally formed spokes and a reenforced outer hub which is adapted to be secured to an inner hub, the reenforcing means including a barrel-shaped member positioned within the outer hub, said article having provision outside the outer hub and between the spokes for attachment to an inner hub.

3. In a vehicle wheel, a rim, a sheet metal unit composed of hollow spokes and an outer hub integrally formed, said outer hub having a barrel-like reenforcement secured on the inner side thereof, and engaging said outer hub between the spokes, the outer hub having adjacent the inner side of the wheel outwardly extending portions between the spokes with openings for attaching bolts.

4. In a wheel, a rim, a sheet metal unit composed of substantially U-shaped spokes and an outer hub portion integrally formed and a reenforcing member for the outer hub portion having a part extending axially thereof and engaging said outer hub between the spokes and a portion on the inner side closing the spokes, said wheel having outside of the outer hub provision for an attachment to an inner hub.

5. In a wheel, a rim, a sheet metal unit composed of substantially U-shaped spokes and an outer hub portion formed integral therewith, a reenforcing member secured to the outer hub portion of the unit and composed of a part extending axially of said outer hub portion and radial extensions on the inner side of the wheel closing the open sides of the spokes, and wheel fastening means located outside of the outer hub portion.

6. In combination, an inner hub and a hub demountable wheel secured thereto and composed of a rim, a sheet metal unit including spokes secured to the rim and an outer hub portion integral with the spokes, including a reenforcing member attached thereto, the outer hub having an outstanding attaching portion and bolts fastening the same to the inner hub, said bolts passing between the spokes through said outer hub portion and its reenforcement.

7. In a vehicle wheel a sheet metal body composed of a plurality of spokes and an outer hub integrally formed, each of said spokes having on the outer side of the wheel a wall which is flared outwardly from near the outer spoke end to near the outer end of the hub, and a barrel-shaped reenforcing member positioned within the outer hub and engaging said outer hub between the spokes, said wheel having provision outside the outer hub and between the spokes for attachment to an inner hub.

8. In a vehicle wheel, a sheet metal body composed of a plurality of substantially U-shaped spokes and an outer hub integrally formed, each of said spokes having on the outer side of the wheel a wall which is flared outwardly from near the outer spoke end to near the outer end of the hub, said body having concavely convexly formed portions between the spokes, a reenforcing member having a portion extending axially of said outer hub and engaging said outer hub between the spokes, and wheel fastening means located outside the outer hub and between the spokes for detachably securing said wheel to an inner hub.

9. In a vehicle wheel a sheet metal body composed of substantially U-shaped spokes and an outer hub formed integrally therewith, the outer walls of the spokes being flared outwardly with a sweeping curve, the side walls of the spokes and the portions of the outer hub between the spokes forming sweeping curves extending from substantially one spoke end to the other, a reenforcing member having a portion extending axially of said outer hub and engaging the outer hub between the spokes, and wheel fastening means located outside of the outer hub and between the spokes for detachably securing the wheel to an inner hub.

10. In a vehicle wheel, a sheet metal body member consisting of a plurality of substantially U-shaped spokes and an outer hub integral therewith, the outer and side walls of the spokes merging with the outer hub, the outer hub being continuous at its outer end, a barrel-shaped reenforcing member positioned within said outer hub and secured to the continuous portion thereof, said body having outstanding portions outside the outer hub and between the spokes, and bolts passing through said outstanding portions to detachably secure the wheel to an inner hub.

11. In a vehicle wheel, a sheet metal body member consisting of a plurality of U-shaped spokes and an outer hub integral therewith, the outer and side walls of the spokes merging with the outer hub, the outer hub being continuous at its outer end, a barrel-shaped reenforcing member positioned within said outer hub, said reenforcing member being secured to the continuous portion of the outer hub and engaging said hub between the spokes, and means located outside the outer hub and between the spokes for detachably securing the wheel to an inner hub.

12. In a vehicle wheel a sheet metal body composed of a plurality of spokes and an outer hub integrally formed, said body member having concavely convexly formed portions between the spokes, a barrel-shaped reenforcing member positioned in said outer hub engaging said outer hub between the spokes, said reenforcing member having a portion of larger diameter adjacent the inner face of the wheel, said body having outstanding portions between the spokes, and bolts extending through said outstanding portions and the enlarged portion of the reenforcing member to secure the wheel on an inner hub.

13. In a vehicle wheel a sheet metal body member consisting of a plurality of spokes and an outer hub integrally formed, the outer and side walls of the spokes merging with the outer hub, said outer hub being continuous at its outer end, a reenforcing member having a portion extending axially of said outer hub and secured to the continuous portion thereof, and a portion of enlarged diameter adjacent the inner side of the wheel, said body member having outstanding portions outside the outer hub and between the spokes, and bolts extending through said outstanding portions and the enlarged portion of the reenforcing member to detachably secure the wheel to an inner hub.

14. In a vehicle wheel, a rim, a sheet metal body composed of an outer hub and a plurality of integrally formed channel shaped spokes connected to the rim, each of said spokes having on the outer side of the wheel a wall which is flared outwardly from near the outer spoke end to near the outer end of the hub, the outer hub comprising generally axially extending wall portions, and a barrel-shaped reenforcing member positioned within the outer hub and making reenforcing engagement with the wall portions of the outer hub, said wheel having provision outside the outer hub and between the spokes for attachment to an inner hub, said reenforcing member comprising radial flange extensions secured to the spoke side walls radially outwardly of the outer hub portion of the wheel body and making engagement with said body so as to sustain radially inwardly directed stresses exerted on said body from the rim.

15. In a vehicle wheel, a rim, a sheet metal body composed of an outer hub and a plurality of integrally formed channel shaped spokes connected to the rim, the outer hub comprising generally axially extending wall portions, each of said spokes having on the outer side of the wheel a wall which is flared outwardly from near the outer spoke end to near the outer end of the hub, and a barrel-shaped reenforcing member positioned within the outer hub and making reenforcing engagement with the wall portions of the outer hub, said wheel having provision outside the outer hub and between the spokes for attachment to an inner hub, said reenforcing member comprising radial flange extensions covered by the spokes.

16. In a vehicle wheel, a rim, a sheet metal body composed of an outer hub and a plurality of integrally formed channel shaped spokes connected to the rim, the outer hub comprising generally axially extending wall portions, each of said spokes having on the outer side of the wheel a wall which is flared outwardly from near the outer spoke end to near the outer end of the hub, and a barrel-shaped reenforcing member positioned within the outer hub and making reenforcing engagement with the wall portions of the outer hub, said wheel having provision outside the outer hub and between the spokes for attachment to an inner hub, said reenforcing member comprising radial flange extensions so secured to the spoke side walls radially outwardly of the outer hub portion of the wheel body and secured to the rim as to sustain radially inwardly directed stresses exerted from the rim.

17. A pressed metal wheel body of the demountable bolted-on type having an annular bolting-on zone, said body comprising a spoke bearing outer hub portion of generally cylindrical form and said zone comprising portions extending radially outwardly of said outer hub portion, spoke elements of generally channeled form having root portions pressed from said outer hub and gradually radially emerging therefrom, said spoke elements having substantially channeled main body portions of substantially reduced axial depth relative to the axial depth of said outer hub, said outer hub, said spoke root portions, and said spoke main body portions merging gradually and curvilinearly to avoid localization of deforming stresses in the region of the junctures therebetween, and a reenforcing annulus for said outer hub having at least a portion thereof telescoped within said outer hub, said annulus terminating substantially at the axially outer extremity of the outer hub.

18. A pressed metal wheel body of the demountable bolted-on type having an annular bolting-on zone, said body comprising a spoke bearing outer hub portion of generally cylindrical form and said zone comprising portions extending radially outwardly of said outer hub portion, spoke elements of generally channeled form having root portions pressed from said outer hub and gradually radially emerging therefrom, said spoke elements having substantially channeled main body portions of substantially reduced axial depth relative to the axial depth of said outer hub, said roots merging gradually and curvilinearly with said main body portions and said hub to avoid localization of deforming stresses in the region of the junctures therebetween, and a reenforcing annulus having an axial extent comprising, at least, a major portion of the depth of the wheel body and having radial flange portions included in said bolting-on zone.

OSCAR U. ZERK.